(12) United States Patent
Brogan (10) Patent No.: US 8,484,692 B2
(45) Date of Patent: Jul. 9, 2013

(54) METHOD OF STREAMING COMPRESSED DIGITAL VIDEO CONTENT OVER A NETWORK

(75) Inventor: Terence R. Brogan, Norton, MA (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/495,417

(22) Filed: Jun. 13, 2012

(65) Prior Publication Data

US 2012/0317605 A1    Dec. 13, 2012

Related U.S. Application Data

(60) Provisional application No. 61/496,558, filed on Jun. 13, 2011.

(51) Int. Cl.
*H04N 7/173* (2006.01)
*H04N 7/16* (2006.01)

(52) U.S. Cl.
USPC .................. 725/143; 725/86; 725/94; 725/95

(58) Field of Classification Search
USPC .......................................................... 725/122
See application file for complete search history.

(56) References Cited

U.S. PATENT DOCUMENTS

| 7,343,614 | B1* | 3/2008 | Hendricks et al. ................. 725/8 |
| 7,788,394 | B2 | 8/2010 | Gregotski et al. |
| 2002/0138500 | A1 | 9/2002 | Bechtel et al. |
| 2004/0181811 | A1* | 9/2004 | Rakib ............................ 725/122 |
| 2006/0130107 | A1 | 6/2006 | Gonder et al. |
| 2007/0104097 | A1 | 5/2007 | Rassool et al. |
| 2009/0260042 | A1 | 10/2009 | Chiang |
| 2010/0312828 | A1* | 12/2010 | Besserglick et al. .......... 709/203 |
| 2011/0066744 | A1 | 3/2011 | Del Sordo et al. |
| 2012/0047542 | A1* | 2/2012 | Lewis et al. ..................... 725/97 |

FOREIGN PATENT DOCUMENTS

EP    2234393  A1    9/2010

OTHER PUBLICATIONS

D. Zatz, "Time Warner Brings Live Cable TV to iPad", www.zatznotfunny.com/2011-03/time-warner-brings-live-cabletv-to-ipad/, dated Mar. 15, 2011.
Time Warner Cable, "iTunes Preview: TWCable TV by Time Warner Cable", dated Mar. 28, 2011.
R. Pantos, et al., "HTTP Live Streaming: draft-pantos-http-live-streaming-05", Internet Engineering Task Force (IETF) Internet-Draft, Nov. 19, 2010.
PCT Search Report & Written Opinion, RE: Application #PCT/US2012/042260, Oct. 18, 2012.

(Continued)

*Primary Examiner* — Justin Shepard (57) ABSTRACT

A method of streaming content includes encapsulating and packetizing HTTP Live Streaming (HLS) content into a MPEG private data Packet Identifier (PID) at a headend of a QAM network. This data service is multiplexed with compressed digital broadcast video content to produce a MPEG transport stream for being transmitted over the network to subscribers. The HLS content is provided to the subscriber in the form of data. At the subscriber location, the MPEG transport stream is received over the QAM network with a tuner that detects HLS content available from the MPEG transport stream in a form of a MPEG private data PID of the MPEG transport stream. The HLS content is buffered from the MPEG private data PID and made available to a wireless IP client device via a local area network connection.

18 Claims, 4 Drawing Sheets

OTHER PUBLICATIONS

R. Pantos et al., "HTTP Live Streaming; draft-pantos-http-live-streaming-06.txt", Internet Engineering Task Force, IETF, Apr. 1, 2011, pp. 1-24.

R. Pantos et al., "HTTP Live Streaming; draft-pantos-http-live-streaming-05.txt", Internet Engineering Task Force, IETF, Nov. 19, 2010, pp. 1-22.

"HTTP Live Streaming Overview", URL:http://www.lifeandstory.org/about/index.php/categoryblog/49-http-live-streaming, XP002638991, 7 pages, retrieved May 24, 2011, dated Aug. 2009.

"Information Technology—Generic coding of moving pictures and associated audio information: Systems", International Standard, ISO/IEC 13818-1:2007(E), 3rd ed., Oct. 2007.

\* cited by examiner

FIG. 1

```
<HLS2MPEGSpooler>

<TRACE
    screen_output_enabled  = "TRUE"
    file_output_enabled    = "FALSE"
    file                   = "HLS2MPEGSpooler_trace.txt"
    level                  = "10"
  />

<HLS
    playlistURL    = "http://demo.anevia.com/smooths_live/hls/euronews.ismlf/euronews-314k.m3u8"
    proxyEnabled   = "TRUE"
    proxyHostname  = "www.gate0.mot.com"
    proxyPort      = "1080"
    cacheDir       = ".\temp\hls\"
  />

<MPEG
    programNumber         = "1"
    pmtPID                = "0x100"
    dataPID               = "0x101"
    dataComponentType     = "0x05"
    maxPacketsPerSection  = "21"
    fileOutputEnabled     = "TRUE"
    outputFilename        = "HLS2MPEGSpooler.mpg"
    udpOutputEnabled      = "TRUE"
    destinationIP         = "127.0.0.1"
    destinationPort       = "21310"
    cacheDir              = ".\temp\mpeg\"
    sleepBetweenBursts    = "TRUE"
  />

</HLS2MPEGSpooler>
```

METHOD OF STREAMING COMPRESSED DIGITAL VIDEO CONTENT OVER A NETWORK

CROSS-REFERENCE TO RELATED APPLICATION

This application claims the benefit under 35 USC §119(e) of U.S. Provisional Patent Application No. 61/496,558, filed Jun. 13, 2011.

BACKGROUND

MPEG (Moving Pictures Experts Group) is an ISO/ITU standard for compressing digital video used for digital terrestrial, cable and satellite TV, DVDs and digital video recorders (DVRs). MPEG-2 provides broadcast quality video with resolutions up to 1920×1080 and supports a variety of audio/video formats, including legacy TV, HDTV and five channel surround sound. MPEG-4 provides for multimedia representation and distribution and offers a variety of compression options including low-bandwidth formats for transmitting content/services to wireless devices.

ISO 13818 generally discusses MPEG-2 transport for transmission and storage of audio, video, and program and system information protocol data. The transport stream has a container format encapsulating packetized elementary streams and is used for terrestrial and satellite broadcast. A packet is the basic unit of data in a transport stream and includes a 13-bit Packet Identifier (PID) which identifies each table or elementary stream in a transport stream.

HTTP Live Streaming (HLS) provides another specification providing a transport approach for delivering live streamed MPEG content via HTTP. HLS is directed for use on Internet Protocol (IP) networks and with content streamed from web servers. This enables Multiple System Operators (MSOs) to offer live video to IP clients directly from their web servers over IP networks. In this manner, MSOs can provide customers with live MPEG-4 streaming of content which can be viewed on wireless devices, such as tablets, smart phones, lap-top computers and the like.

The streamed content can correspond to TV programs currently being broadcast on TV channels (i.e., live TV); however, unlike traditional broadcast of TV programs, the content is streamed from web servers on IP networks. Thus, a consumer can watch live streaming TV channels, for instance, via their home or other WiFi connection, on their wireless IP devices. This effectively turns wireless tablets, smart phones, and like portable devices into another TV screen that can be used to view live TV programs (i.e., programs currently being broadcast).

A drawback with the use of the HLS approach for live streaming of TV programs is that it can introduce scaling/bandwidth issues on the web server and IP network side. Thus, the direct IP transport approach for streaming live TV content increases the burden on the IP delivery network, and the burden multiplies as the number of users scales. It also increases server hardware requirements, which expands as the number of simultaneous users scales. Still further, there are concerns with respect to hacking, copy protection, and unintended access to content delivered over an IP network.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

As discussed above, MPEG is the standard by which digital video is compressed as used by digital terrestrial, cable and satellite TV providers for providing broadcast television programs to subscribers typically over hybrid fiber-coaxial cable (HFC) networks with the use of set top boxes or like tuners at the customer premises. Quadrature Amplitude Modulation (QAM) is the modulation format typically used by cable TV providers to encode and transmit digital cable TV channels over HFC networks. QAM does not specify the format of the digital data being carried.

Many set top boxes and tuners provided within televisions and like electronic components contain hardware for receiving and processing MPEG-2 content and services received from providers. For instance, a set top box (STB) may be able to receive MPEG-2 content of a TV program broadcast on a given channel and process the content for display on a TV or like monitor. However, such a STB may not have the needed hardware to process MPEG-4 content and services which can be used to stream video, for instance of a TV program currently being broadcast (i.e. "live") on a TV channel and in a format for being transmitted to wireless devices, for instance, tablet devices, lap-top computers, smart phones, and the like. Thus, as discussed above, streaming of this type of content has been accomplished over IP networks.

Embodiments disclosed herein relate to methods of streaming content. For instance, a method of streaming content with respect to process steps performed at the headend of a cable TV network or the like and a method of streaming content with respect to process steps performed at a subscriber site via use of a STB or the like. At the headend location, a MPEG data service is produced by encapsulating and packetizing HTTP Live Streaming (HLS) content into a MPEG private data Packet Identifier (PID). This is multiplexed with compressed digital broadcast video content to produce a MPEG transport stream which is then transmitted over a Quadrature Amplitude Modulation (QAM) network to a subscriber. Thus, the HLS content is provided to the subscriber in the form of data. At the subscriber location, a MPEG transport stream is received over the QAM network with a tuner that automatically detects HLS content available from the MPEG transport stream in a form of a data PID of the MPEG transport stream. The HLS content is buffered from the data PID and provided to an IP client device.

Accordingly, embodiments disclosed herein utilize and support HLS via QAM-based MPEG transports over QAM/MPEG delivery networks with the use of legacy set-top boxes (i.e., set top boxes having hardware to support only MPEG-2 transport streams). These methods provide a means, for instance, of supporting MPEG-4 streaming via MPEG-2 set-top boxes (i.e. "legacy" STBs) that otherwise have no built-in support or hardware for processing MPEG-4 streaming. Thus, existing customer-premises equipment (CPE) (e.g., legacy STBs that support MPEG-2 with no built-in support for MPEG-4) and existing QAM delivery networks can be leveraged to provide MPEG-4 live streaming without the need for transcoders and the like within the CPE. These methods reduce or eliminate scaling/bandwidth issues associated with direct IP streaming over MSO networks, and permit existing MPEG-2 (legacy) STBs to stream live MPEG-4 content to IP client devices (e.g., tablets, pads, smart phones, etc.) over an in-home network or like local area network.

Embodiments disclosed herein also address an approach for encrypting MPEG-4 live streaming content such that the STBs are not directly involved in the delivery of decryption keys or like to decode such content. Thus, distribution of decryption keys may remain under the sole control of the MSOs.

Further embodiments aggregate QAM in-band services in a manner enabling a single tuner of a STB or the like to be capable of simultaneously processing multiple services for streaming content. Accordingly, the embodiments provide a means of scaling live streamed content across a huge population (huge subscriber base) without major impact to MSO IP networks, and can provide for aggregation of MPEG services in a manner that expands upon the otherwise traditional approach of one service provided per tuner model at any given time.

The methods described herein can provide a software-based solution for live TV streaming that leverages existing in-home STB hardware, supports unlimited scaling without significantly increasing MSO IP network burden, and eliminates the need for server scaling to meet increased user demand for live TV via wireless IP client devices. By way of example, MPEG-4 HLS content is made available to STBs via the QAM network by encapsulating HLS content into MPEG Private data PID streams (i.e., HLS SPTS becomes encapsulated into a single data PID) and by multiplexing these data PID streams with their respective MPEG-2 services.

At the subscriber site, the STB handles the HLS data PID streams by automatically detecting HLS stream availability with respect to a tuned channel, buffers HLS content from the data PID, and makes the HLS content available to IP client devices on in-home network, for instance, by way of Ethernet connection to the home network. In this manner, the legacy STB offers streaming functionality without requiring hardware or the like to perform transcoding of such content. Thus, no new hardware or CPE is required by the subscriber. Client devices can be used to control the STB (e.g., tuning), multiple tuners simultaneously can be leveraged, HLS data PIDs recorded on DVR capable STBs can be made available for playback at a later time, and all processing can be performed at the application layer thereby eliminating the need for specialized firmware functionality (other than supporting network connectivity via Ethernet port).

The above functionality can be provided by way of a software-based approach via code download over the provider's network. No new download server is required. In this arrangement, MPEG-2 legacy STBs become conduits for MPEG-4 streaming, and MPEG-4 HLS content is fed directly from STBs to an in-home or like local area network. Digital Rights Management (DRM) handshaking (e.g., for decryption keys) is provided directly between the client devices and the head-end of the provider's network. This leaves complete control to MSOs as to how to restrict/allow decode of content streamed from STBs to client devices. No direct support of DRM is required within the STB; rather, the STB acts only as an intermediary in the MPEG-4 delivery system. Content providers are reluctant to allow MSOs to provide their content for distribution via HLS over the Internet due to hacking, copy protection, and access concerns. However, by delivering the HLS content as data via the HFC/QAM network, its delivery to subscribers can be controlled via traditional conditional access (CA) by the MSOs, such that the content cannot only be encrypted as an HLS feed by itself, but also encrypted and access controlled by the CA system as part of the MPEG-2 service that it accompanies. Thus, only specific set-tops that have been granted entitlement to the content can tune and access it. The final IP delivery of the HLS content can then be limited to the in-home network (rather than over the Internet) and only to registered client devices that must again obtain decryption keys from the MSO via a secondary handshake.

Accordingly, all transcoding is performed at the headend by MSO equipment. The transcoded content can be "pre-encrypted" by the MSO, and the transcoded content in the form of a MPEG-4 SPTS is delivered to STBs through the QAM network via data PIDs alongside corresponding MPEG-2 services. STBs buffer content delivered via data PIDs and make the content available to wireless client devices over in-home network via HLS. Since MPEG-4 content is treated as data, it can be handled by legacy MPEG-2 STBs without STB decode, decryption, or DRM support required. STB generated playlists can include headend URLs for client devices use in obtaining decryption keys. The client devices obtain streamed IP content via legacy STBs, and an investment in QAM bandwidth is traded for IP bandwidth savings and streamer capability in-home without new CPE.

Figure 1:
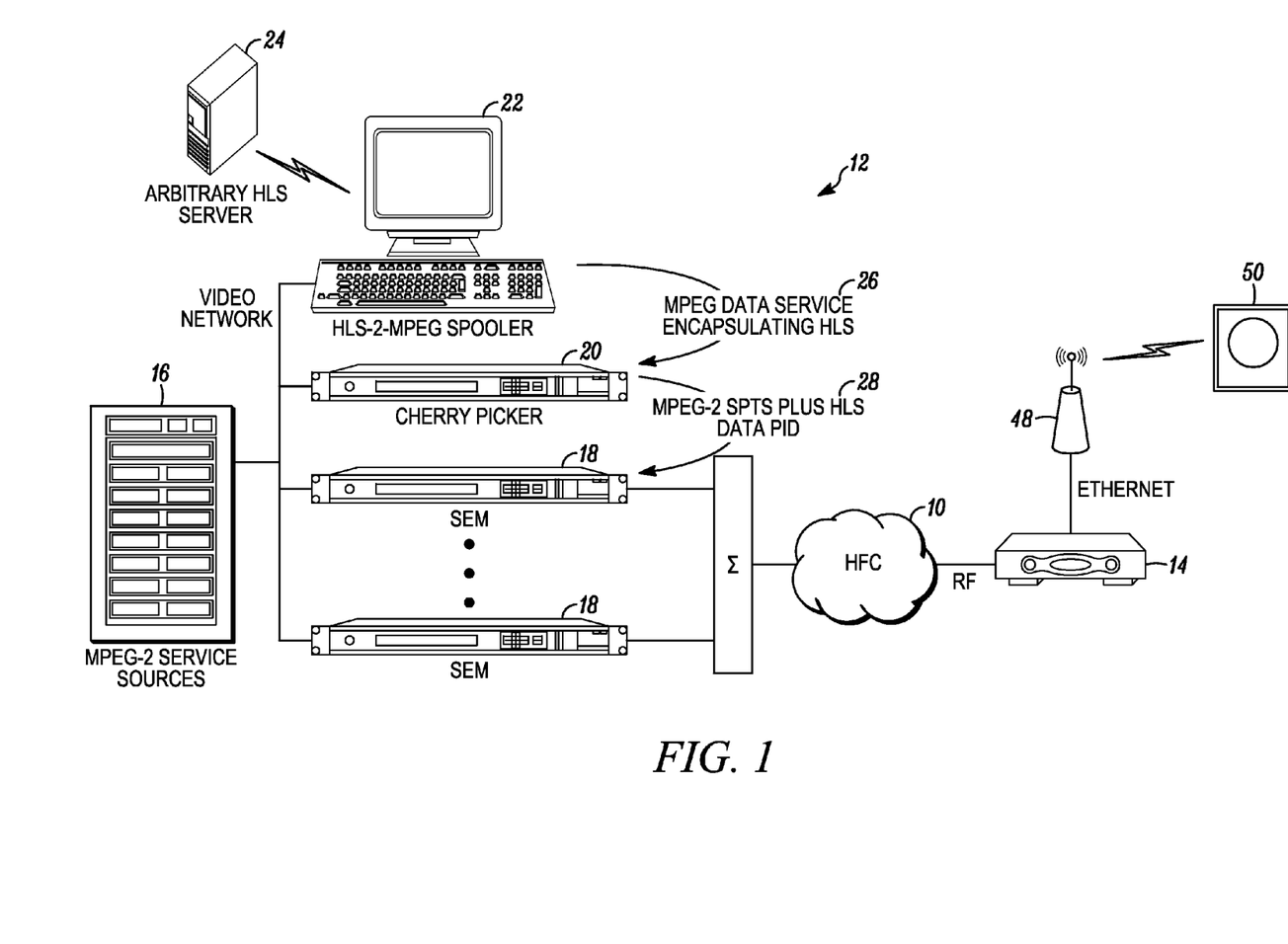
FIG. 1 illustrates a simplified system overview of a cable TV network from a headend of the network to an exemplary set top box located at a customer premises according to an embodiment.

For purposes of example, a hybrid fiber-coax cable (HFC) network 10 is shown in FIG. 1 and represents a portion of the network extending between a headend 12 of the network (left side of FIG. 1) to a STB 14 (right side of FIG. 1) located at a home or the like of a subscriber.

In an illustrative example of headend 12, component 16 represents sources of MPEG-2 services (e.g., a plurality of content providers providing MPEG-2 video content), and components 18 represent encryptor/modulator devices that provide MPEG-2 transport streams to the network 10 for TV channel broadcasts and the like; for example, components 18 can include one or more processors configured for stream processing features such as multiplex creation, encryption, modulation, up-conversion, and edge configuration; in some embodiments, components 18 may be integrated stream processing devices, such as a SmartStream Encryptor Modulator (SEM). A combiner (see the component labeled "Σ" in FIG. 1) merges RF modulated QAM output signals from N-number of modulation devices, such as components 18, into a single output coax cable. Each of the components 18 receives one or more single program transport streams and merge them into a multiple program transport stream that is then RF modulated (i.e., QAM) onto a carrier for ultimate transmission via combiner "Σ" to set-top boxes 14 via the HFC network 10. As discussed above, the components 18 may also perform encryption. In general, there can be many modulators producing many different outputs on different carriers (i.e., physical frequencies), all of which can be provided to the combiner "Σ" and combined onto a single coax cable for simultaneous transmission to a population of set-top boxes 14. In turn, each of the set-top boxes 14 can use its physical in-band tuner or tuners to access a particular multiplex (i.e., QAM channel), from which it can then access the associated multiple program transport stream and select a service.

Figure 2:
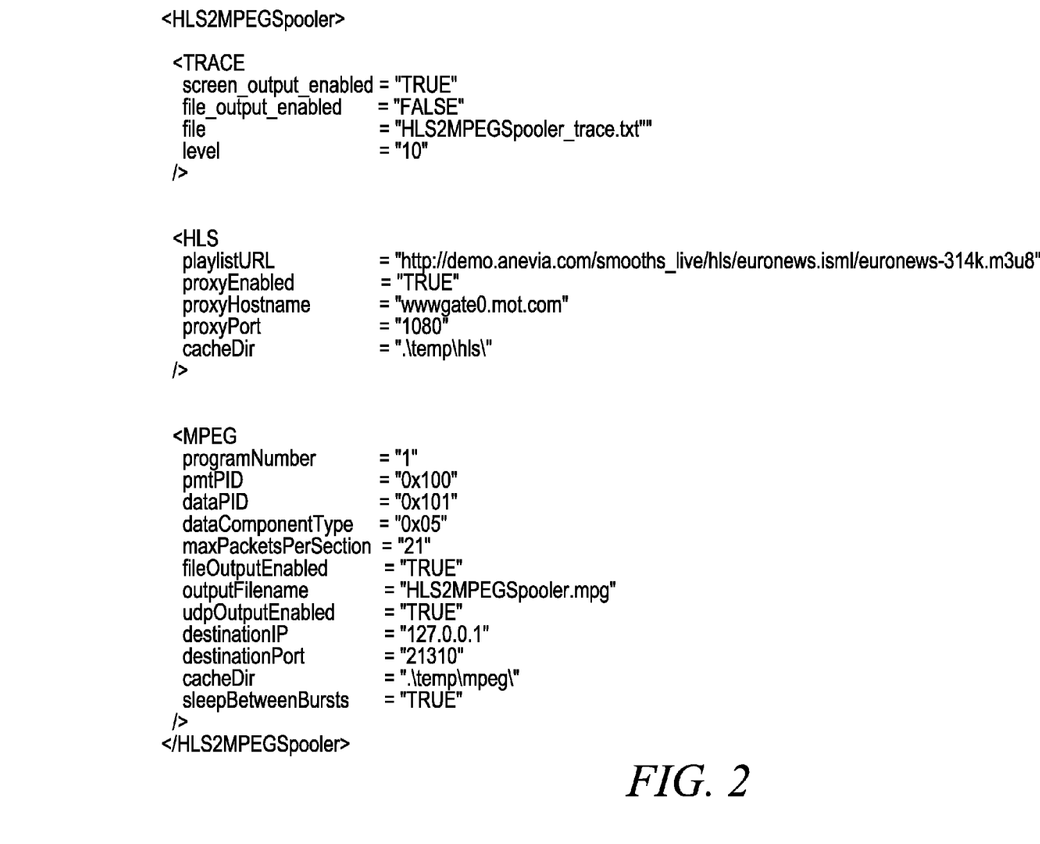
FIG. 2 depicts exemplary configuration data for use in an implementation of an HLS-2 MPEG spooler in accordance with an embodiment.

In an embodiment, the headend 12 includes a digital video application platform 20; for example, the digital video application platform 20 (examples of which include Motorola's CherryPicker® application platform) can include one or more processors configured for features such as rate shaping, ad insertion, and statistical multiplexing. The headend 12 may also include a spooler 22. In this embodiment, the spooler 22 connects and communicates with a HLS server 24 for purposes of downloading MPEG-4 HLS playlists and media files and produces a MPEG data service single program transport stream (SPTS) 26. For example, the MPEG-4 HLS content provided by the server 24 is encapsulated within MPEG private sections by the spooler 22, and the private sections are packetized to produce a data PID thereby producing a MPEG data service containing a data PID with HLS content. FIG. 2 depicts exemplary configuration data for use in an implementation of the spooler 22 in accordance with an embodiment. As an alternative to the use of a spooler 22, the data service could be produced at the same time that the HLS content is being produced, such that there is no need for a spooler to access/pull the HLS content from an HLS server. Of course, the means of creating a data service could be accomplished in many different ways and the above description merely provides an example.

In the embodiment shown in FIG. 1, the MPEG data service is spooled from the spooler 22 to the application platform 20 which automatically adjusts bitrates to adapt to incoming HLS feed. Thus, the application platform 20 multiplexes the MPEG data service with a corresponding MPEG-2 service received from the MPEG-2 service source 16. As a result, the application platform 20 provides the encryptor/modulator 18 with a MPEG-2 single program transport stream (SPTS) 28 for a particular service (i.e., a TV program on a particular channel) with corresponding MPEG-4 HLS content included as a data PID of the transport stream 28.

Figure 3:
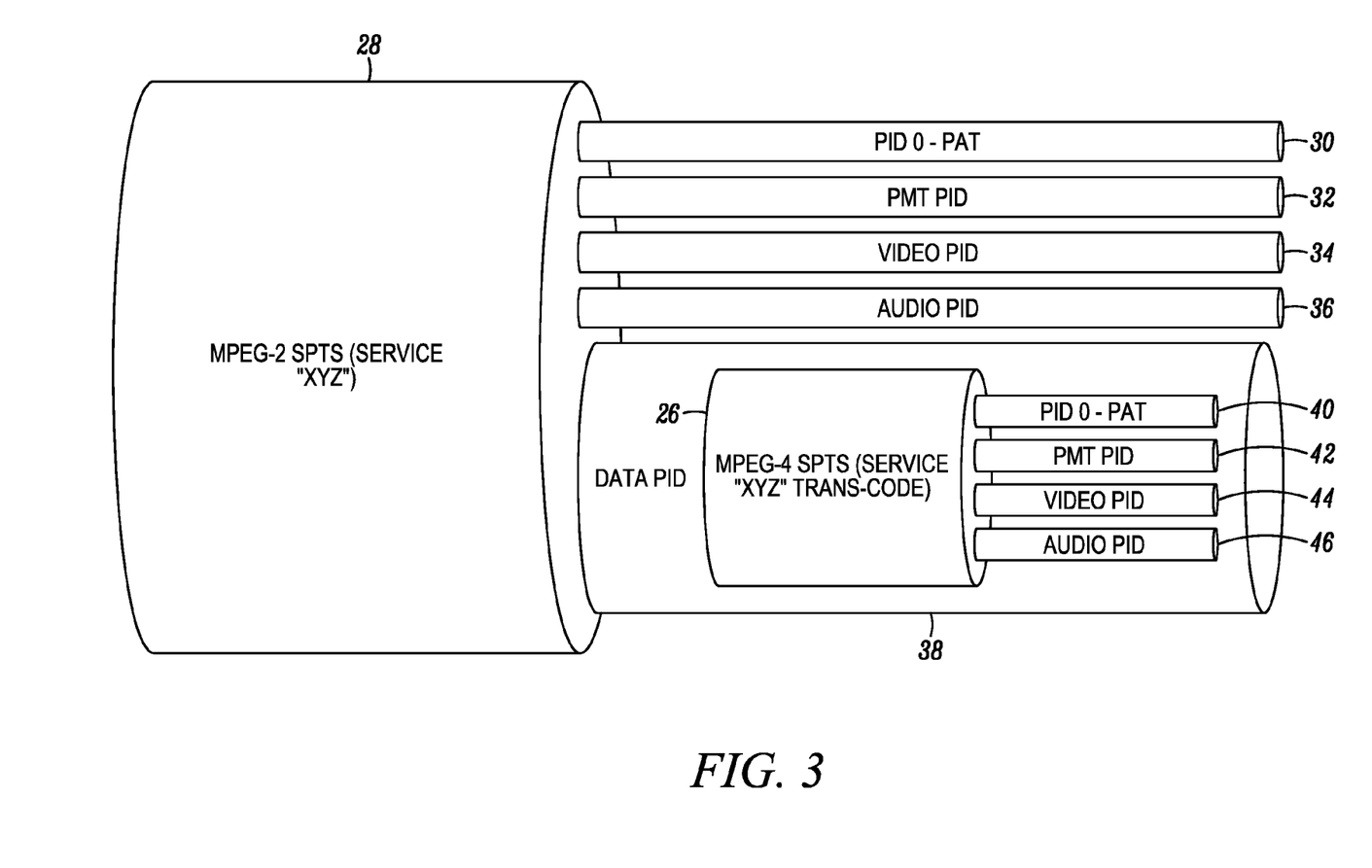
FIG. 3 is an illustrative showing of an example of a MPEG-2 Single Program Transport Stream (SPTS) having a HLS data PID according to an embodiment.

FIG. 3 provides an illustration explaining the configuration of this transport stream. For instance, the MPEG-2 SPTS 28 could be for a service "XYZ" (i.e., a particular TV program or the like). This transport stream 28 includes a PID 0-Program Association Table (PAT) 30 that lists all programs available in the transport stream, a Program Map Table (PMT) PID 32 that contains information about programs, a video PID 34, an audio PID 36, and a private data PID 38. The private data PID 38 encapsulates the MPEG data service 26 described above with respect to providing the MPEG-4 HLS content as data. Thus, the data PID 38 also includes a PID 0-PAT 40, a PMT PID 42, a video PID 44, and an audio PID 46.

The transport stream 28 is encrypted and modulated and transmitted across the HFC network 10 to subscribers, and the set top box 14 receives the above referenced transport stream 28. The set top box 14 may be a DVR or non-DVR set-top box that is adapted to discover the presence of an HLS data PID on the currently tuned channel and that automatically ingests and caches such data. The STB 14 uses pre-allocated memory that it manages to prevent fragmentation and re-assembles HLS media files into RAM requiring minimal CPU overhead. A re-assembly algorithm can be driven via linked lists so that copying of data can be avoided. The STB 14 maintains a dynamic buffer of HLS data and can be set to discard "stale" information based on duration settings provided by the incoming HLS feed. In addition, the STB 14 can include a mini web server that supports HTTP requests from client devices. For instance, the STB 14 may support requests for HLS playlists and media files, dynamically produce playlists based on currently cached HLS data, and support other requests (e.g., "change channel", etc.).

As shown in FIG. 1, the STB 14 may connect to a home network or like local area network via an Ethernet connection, wireless connection or the like. A wireless router 48 connected to the home network can be used to communicate the HLS content to a client device 50. The typical client device 50 may support various protocols such as mDNS, HLS, and REST protocols, may be able to discover available set-top streams, and may be able to perform playbacks.

Thus, an end user may be able to view MPEG-2 content on a television screen (not shown) to which the STB 14 is connected and/or view the MPEG-4 HLS content on the portable wireless client device 50. The MPEG-2 content and the MPEG-4 HLS content may or may not correspond to the same TV program or like content or service. For example, if the MPEG-2 content viewable on a television screen is of a particular baseball game broadcast on a particular channel, the same game can be viewed at the same time on the client device 50 (i.e., so-called "live" TV).

Merely for purposes of example, and not by way of limitation, protocols supported by the methods and above described apparatus may include HLS-2-MPEG Messaging Protocol, HTTP 1.1, HLS, mDNS, MR-DVR Discovery/Event Protocol, and REST. HLS-2-MPEG Messaging Protocol is a protocol specifically designed to support embodiments disclosed herein, to provide a methodology for segmenting HLS playlist information and media files into MPEG private sections, and to support transmission of HLS media files and supporting information for the dynamic re-creation of playlists. HTTP 1.1 is a protocol that supports transfer of HLS playlists and media files between the set-top and client devices, and HLS is a protocol that provides for delivery of playlist information and associated media files via HTTP (i.e., supports playbacks via client devices) and includes a mechanism for specifying how/where to obtain any needed decryption key. The mDNS protocol can be implemented by the set-top box to support discovery and events and may be used to support discovery of the set-top box via client devices (e.g., running applications that advertise the IP address of the STB and playlist URL). The MR-DVR Discovery/Event Protocol can provide for discovery of MR-DVR servers (application layer) and can be used as an alternative to mDNS for discovery and event distribution. The REST protocol can be supported via HTTP to support streamer commands (e.g., Change Channel, Status, etc.).

The above protocols can be integrated with existing applications, such as TVGI A25/A28 by default. This enables extensible functionality such as client-based tuning via TVGI applications. This also allows operation within MR-DVR environments. In addition, the above described functionality can operate as an independent application alongside any EPG. MPEG data processing and HLS server functionality only relies on set-top firmware application programming interfaces (APIs). However, EPG integration, similar to TVGI, would be needed to support operations such as client-based tuning.

By way of example, an implementation in accordance with an embodiment disclosed above may include the following features: a system running on Motorola DCX-3400M with Irvine 2.3.1 and TVGI A28.0-2; Ethernet port enabled and IP address provisioned via DHCP; and H-VGA HLS feed obtained from an un-encrypted Internet news service.

A further example of an implementation in accordance with an embodiment can include the following features: the news service feed replaced with a feed taken from a Motorola Streamer to permit creation of an MPEG-2 live-TV service in the headend that incorporates a transcoded version of itself on an accompanying data PID; decryption keys obtained by the client device directly from the head-end (not via the set-top) which can be supported by a "proxy" oriented approach in which the set-top is the proxy; HLS "EXT-X-KEY" information supplied via the HLS-2-MPEG Messaging protocol to the set-top for output via its generated playlist; and the client device obtains the playlist and the media files via the set-top, but obtains the decryption keys via a head-end URL.

A still further embodiment includes the use of a dual or multi-tuner streamer. According to this embodiment, MPEG-4 data PIDs visible on any tuner on a set-top that is connected to the home network can be made available to client devices. For instance, a STB having dual tuners provides an opportunity for client devices to use (i.e., tune) the background tuner without interfering with simultaneous TV viewing. Here, client devices could "follow" the foreground tuner content without interference, or could tune regardless.

Similarly, the existence of multiple legacy set-top boxes within the home provides a means of pooling "available" tuners for client device usage (i.e., provide avoidance of tuner contention). Any legacy set-top on the in-home network becomes another available tuner for client devices.

Another contemplated embodiment is a DVR content streamer which may operate similar to multi-tuners described above. DVR playbacks utilize the playback tuner which is separate from in-band tuners. Access to recorded data PIDs via the playback tuner is identical to the access provided by in-band tuners to "live" data. A recorded MPEG-4 data stream can be made available to client devices and allow the client devices to "follow" a DVR set-top box's in-progress playback. MR-DVR playbacks work similarly when processed on the set-top box (i.e., the set-top box can make available an HLS feed of its current MPEG-2 playback for wireless MPEG-4 client device consumption). During playback of pre-recorded content, all in-band tuners essentially become "background" tuners, opening greater opportunity for client device access without impacting TV viewing. The playback tuner acts as a third tuner in this case. In a further embodiment, each recorded MPEG-4 data PID available for HLS playback may be made available without tying it to an associated DVR/MR-DVR playback.

Further, a synchronize-and-go ("Synch-N-Go") embodiment can be provided. DVR recorded MPEG-4 data PIDs (SPTS content only) could be copied to client devices via an HLS or progressive download oriented manner. Decryption keys are controlled/accessed via the headend, and metadata for a particular MPEG-4 data PID could be gleaned from the "parent" recording or via information embedded within the data PID itself.

Figure 4:
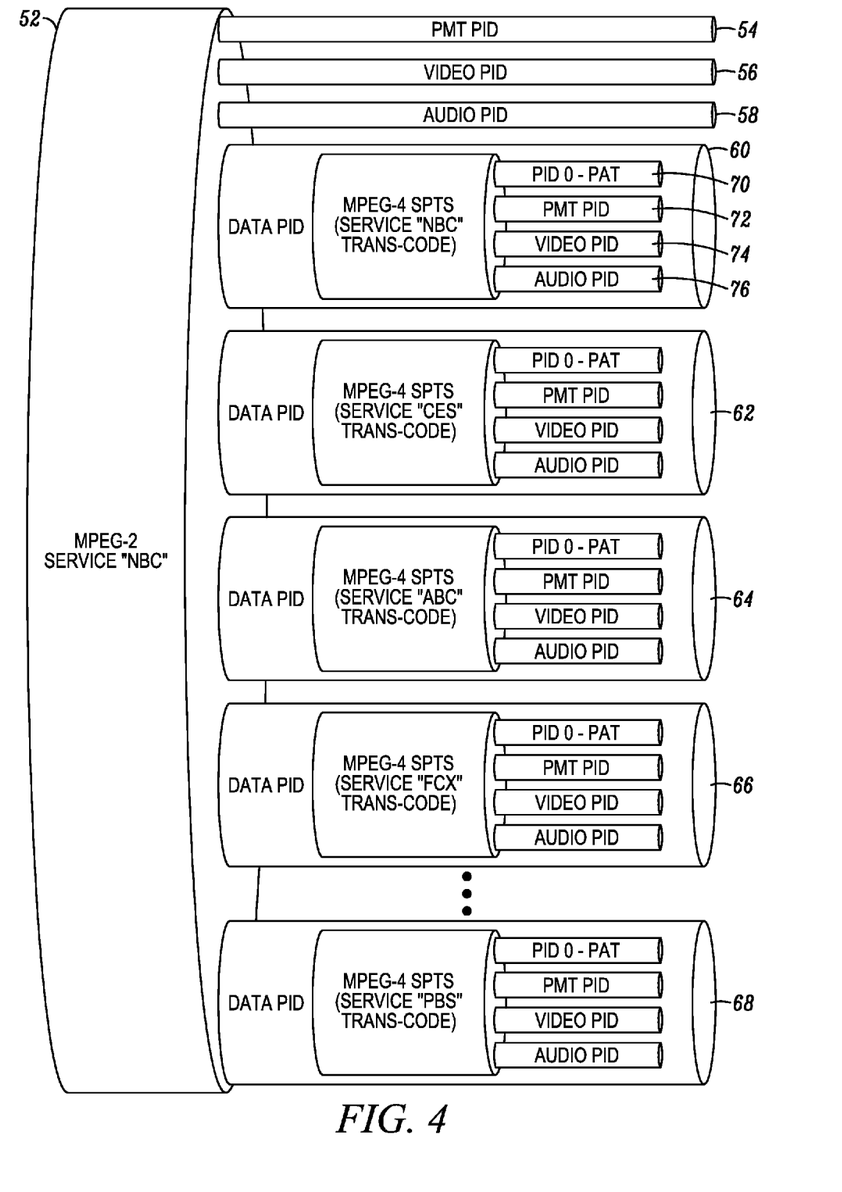
FIG. 4 is an illustrative showing of an example of a MPEG-2 Transport Stream having HLS data PIDs providing an aggregation of different content/services according to an embodiment.

As yet a further option, an aggregation of different services can be provided on the transport stream transmitted by the headend over the HFC network. As an example, FIG. 4 depicts a transport stream 52 providing service aggregation. Conventional set-top tuning pairs a single tuner with a single service. However, in accordance with this contemplated embodiment, delivery of transcoded MPEG-4 services via data PIDs allows a single tuner of a set top box or the like to be paired with N-number of different services.

FIG. 4 provides an illustration explaining the configuration of this type of transport stream 52. For instance, the MPEG-2 SPTS 52 could be for the service "NBC". This transport stream 52 includes a Program Map Table (PMT) PID 54 that contains information about programs, a video PID 56, an audio PID 58, and a pre-determined number of private data PIDs 60, 62, 64, 66 and 68. The private data PID 60 is a MPEG-4 SPTS data service corresponding to the "NBC" service. However, the data PIDs 62, 64, 66 and 68 are MPEG-4 SPTS data services for "CBS", "ABC", "FOX" and "PBS" transcoded services, respectively. Each of these data services includes a PID 0-PAT 70, a PMT PID 72, a video PID 74, and an audio PID 76. Thus, a client device is able to request and consume any of these services provided by the transport stream 52.

Thus, all MPEG-4 transcodes within a single multiplex (see FIG. 4) can be added as data PIDs to all services within that multiplex. All services in the multiplex could reference the same data PIDs. Each in-band service could then contain N virtual services and allows client devices to access a "package" of available services for viewing via a single tuner. This reduces tuner contention and provides the possibility for the set-top user, and multiple client devices, to all view different programs at the same time with only a single tuner. The use of MPEG-4 and/or transcoding is referenced herein by way of example only. The content of the data PIDs may be in formats other than MPEG-4 and are not required to be transcoded. This embodiment is generally directed to the treatment of MPEG content as data within a MPEG transport stream.

For purposes of an example of aggregated services, a transport stream (such as transport stream 52 shown in FIG. 4) may include a QAM256 Multiplex with ten MPEG-2 SD services and ten MPEG-4 HVGA transcodes corresponding to each SD service. Each SD service can contain all 10 transcodes within its PMT. The set-top user can view the tuned virtual channel, while separate client devices can select from and view up to ten different programs on the multiplex without further tuner contention. Of course, with respect to use of a dual tuner box, the number of available client offerings could double (e.g., twenty for this particular example).

Yet a further embodiment is one in which aggregated services are recorded and played back at a later time. Conventional DVR recording, similar to tuning, pairs a recording with a single service from a single tuner. DVR set-tops can record all PIDs listed in the PMT. In accordance with an embodiment, the service aggregation concept described above is leveraged for simultaneous recording of multiple programs/services via a single tuner. This can support rapid pre-loading of content onto the set-top hard disk (e.g., for targeted ad insertion or the like) and permits more simultaneous user requested recordings due to reductions in tuner conflicts. To prevent recording of unwanted PIDs, firmware could be modified to support selective recording of PIDs within a particular service. As stated above, the service aggregation is not necessarily limited to MPEG-4 content; rather, it can be used in connection with any content treated as data whether or not transcoded.

Another embodiment relates to the use of an existing DVR set-top box as a more advanced IP type set-top box. An IP set-top box can operate as a gateway/server for services into the home. It typically supports QAM tuning as well as transcoding and makes tuned/recorded/transcoded services available to other client devices. Thus, according to an embodiment, an existing DVR set-top box can be used as a gateway/server (i.e., an IP type set-top box) when it leverages the streaming concept disclosed herein to eliminate the need for local transcoding. Such an existing dual tuner DVR box could also utilize the service aggregation concept described above to make more than two services available simultaneously (i.e., by removing the traditional single tuner per service limitation). Use of an existing DVR set-top box in this manner may aid in transitioning networks to all MPEG-4 (QAM delivery of MPEG-4 services to household and IP delivery of MPEG-4 services to clients within the household). For purposes of example, a dual tuner DVR capable ASTB (e.g., DCT64XX) providing headless operation with RAM used for buffering/serving instead of decode may be used as a conduit for MPEG-4 services supplied as data PIDs while leveraging service aggregation as described above. MPEG-4 content could be supplied to IP clients via HLS. Different encodings could support different clients, where each encoding exists within its own data PID, and available encodings are advertised via an HLS Variant Playlist. The MPEG-4 content could be HD, SD, VGA, and/or HVGA encodings of any particular service. A dual tuner set top box may be able to access all services across two different multiplexes simultaneously using service aggregation described above. Two tuners could support more than two clients watching different programs at the same time and could record data and make available via MR-DVR, HLS, progressive download, and the like.

Finally, any delivery mechanism for providing HLS content encapsulated in a MPEG private data PID can be used by a MSO. For example, the delivery mechanism can be linear broadcast, video on demand (VOD), or switched digital video (SDV). Thus, the HLS content encapsulated in a MPEG private data PID can be provided with the transport stream for a given channel whether requested or not requested by a subscriber, or a tune command may be required to be sent upstream on the network from a subscriber to the headend to cause headend equipment to grab the service and deliver it to the requesting subscriber (e.g., the first user on the plant). This later approach may eliminate the need to provide all HLS content as linear broadcasts before a first subscriber starts to use the service. Thus, the transport approach can include linear HLS delivery as well as a cross between linear HLS delivery and VOD utilizing switched digital video techniques.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements.

The above referenced devices, servers, components, equipment, boxes, tuners and the like for carrying out the above methods can physically be provided on a circuit board or within another electronic device and can include various processors, microprocessors, controllers, chips, disk drives, and the like. It will be apparent to one of ordinary skill in the art that the processors, controllers, tuners, units, and the like may be implemented as electronic components, software, hardware or a combination of hardware and software. One of ordinary skill in the art appreciates that various modifications and changes can be made without departing from the scope of these embodiments as defined in the appended claims.

I claim:
1. A method of streaming content over a network, comprising the steps of:
producing a MPEG data service by encapsulating and packetizing HTTP Live Streaming (HLS) content into a MPEG private data Packet Identifier (PID);
multiplexing compressed digital broadcast video content with the MPEG data service to produce a MPEG transport stream; and
transmitting the MPEG transport stream over a Quadrature Amplitude Modulation (QAM) network to a subscriber;
wherein the compressed digital broadcast video content of the MPEG transport stream is a MPEG-2 transport stream; and
wherein the compressed digital broadcast video content is of a pre-determined broadcast TV program, and wherein the MPEG data service provided in the form of the MPEG private data PID of the MPEG transport stream is a transcoded version of the pre-determined broadcast TV program such that the HLS content is simultaneously delivered to the subscriber with the MPEG-2 pre-determined broadcast TV program.
2. A method according to claim 1, further comprising the step of transcoding the HLS content at a headend of the QAM network.
3. A method according to claim 1, further comprising the step of downloading the HLS content from an HLS server before said step of producing the MPEG data service.
4. A method according to claim 1, wherein the MPEG data service is a MPEG-4 data service single program transport stream.
5. A method according to claim 1, wherein said multiplexing step includes a step of spooling the MPEG data service to a content insertion device used to produce the MPEG transport stream.
6. A method according to claim 1, further comprising the steps of encrypting and modulating the MPEG transport stream before said transmitting step.
7. A method according to claim 1, wherein the HLS content is transcoded MPEG-4 HLS content including playlists and media files, wherein the MPEG transport stream is a MPEG-2 single program transport stream, and wherein the MPEG private data PID is a MPEG-2 private data PID.
8. A method according to claim 1, wherein said producing step includes producing a plurality of different MPEG data services each being encapsulated and packetized as HTTP Live Streaming (HLS) content into different MPEG private data Packet Identifiers (PIDs), and wherein said multiplexing step includes multiplexing the compressed digital broadcast video content with the plurality of different MPEG data services to produce the MPEG transport stream.
9. A method according to claim 1, wherein the QAM network is a cable television hybrid fiber optic-coaxial cable network.
10. A method of streaming content over a network, comprising the steps of:
receiving a MPEG transport stream via a Quadrature Amplitude Modulation (QAM) network with a tuner;
automatically detecting HLS content available from the MPEG transport stream in a form of a MPEG private data Packet Identifier (PID) of the MPEG transport stream;
buffering the HLS content obtained from the MPEG private data PID; and
providing the HLS content to an IP client device.

11. A method according to claim 10, wherein said providing step includes making the HLS content available on a local area network to which the IP client device is connected.

12. A method according to claim 10, wherein the HLS content provided by the MPEG transport stream is transcoded as received by the tuner.

13. A method according to claim 10, wherein the HLS content provided by the MPEG transport stream is encrypted as received by the tuner.

14. A method according to claim 10, wherein the tuner is a cable TV set top box and the HLS content includes playlists and media files.

15. A method according to claim 14, further comprising the steps of:
- reassembling the media files of the HLS content from the MPEG private data PID into RAM of the set top box;
- maintaining a dynamic buffer within the set top box of the playlists and media files; and
- receiving a request for at least one of the playlists and media files from the IP client device.

16. A method according to claim 14, wherein the set top box is connected to a local area network, and wherein the IP client device is a portable electronic device communicating with the local area network via wireless communications.

17. A method according to claim 10, wherein the MPEG transport stream includes an MPEG-2 single program transport stream of a service and the HLS content, and wherein the HLS content is transcoded MPEG-4 HLS content of the service provided by the MPEG-2 single program transport stream such that the HLS content is simultaneously received by the tuner with the MPEG-2 single program transport stream.

18. A method according to claim 10, wherein, during said detecting step, a plurality of different HLS contents from a plurality of MPEG private data Packet Identifiers (PIDs) available from the MPEG transport stream is detected, and wherein, during said providing step, different HLS contents are simultaneously provided to a plurality of IP client devices.

* * * * *